US011685800B2

(12) United States Patent
Pastena et al.

(10) Patent No.: US 11,685,800 B2
(45) Date of Patent: Jun. 27, 2023

(54) MULTI-STAGE POLYMER WITH LOW MW SHELL AND HIGH TG CORE FOR EARLY BLOCK RESISTANCE

(71) Applicant: Columbia Insurance Company, Omaha, NE (US)

(72) Inventors: Gianna Pastena, Flanders, NJ (US); Hrire Gharapetian, Ridgewood, NJ (US)

(73) Assignee: Columbia Insurance Company, Omaha, NV (US)

( * ) Notice: Subject to any disclaimer, the term of this patent is extended or adjusted under 35 U.S.C. 154(b) by 390 days.

(21) Appl. No.: 16/921,059

(22) Filed: Jul. 6, 2020

(65) Prior Publication Data
US 2022/0002459 A1 Jan. 6, 2022

(51) Int. Cl.
*C08F 2/22* (2006.01)
*C08F 220/40* (2006.01)
*C08K 5/20* (2006.01)
*C08L 33/08* (2006.01)
*C08L 33/12* (2006.01)

(52) U.S. Cl.
CPC .............. *C08F 220/40* (2013.01); *C08K 5/20* (2013.01); *C08L 33/08* (2013.01); *C08L 33/12* (2013.01); *C08L 2207/53* (2013.01)

(58) Field of Classification Search
CPC . C08F 220/40; C08F 2/22; C08F 2/38; C08K 5/20; C08L 33/08; C08L 33/12; C08L 2207/53; C09D 5/20; C09D 5/02
USPC ....................................................... 523/201
See application file for complete search history.

(56) References Cited

U.S. PATENT DOCUMENTS

| 9,611,393 | B2 | 4/2017 | Hibben et al. |
| 10,035,923 | B2 | 7/2018 | Betremieux et al. |
| 10,273,378 | B2 | 4/2019 | Bell et al. |
| 10,301,501 | B2 | 5/2019 | Hibben et al. |
| 2005/0107527 | A1 | 5/2005 | Holub et al. |
| 2007/0154646 | A1* | 7/2007 | Bochnik .............. C09D 135/06 528/10 |
| 2014/0235752 | A1 | 8/2014 | Gharapetian et al. |
| 2017/0174905 | A1 | 6/2017 | Bohling et al. |
| 2019/0389993 | A1 | 12/2019 | Junk et al. |

FOREIGN PATENT DOCUMENTS

EP         0609756 A2    8/1994

OTHER PUBLICATIONS

English Translation of WO 2018155677 (Year: 2018).*
International Search Report and Written Opinion issued in connection with the corresponding International Application No. PCT/US2021/039844 dated Oct. 13, 2021.
Hans-Georg Elias Ed—Hans-George Elias: "Makromolekule, Grundlagen: Struktur, Synthese, Eigenschaften, Thermische Umwandlungen Und Relaxiationen", Jan. 1, 1990. Huthig & Wepf Verlag, Basel Heidelberg, New York. pp. 845-857. XP002594550, ISBN: 978-3-85739-101-9.

* cited by examiner

*Primary Examiner* — Hannah J Pak
(74) *Attorney, Agent, or Firm* — The H.T. Than Law Group

(57) ABSTRACT

Polymers including multi-stage polymers that combine the structural integrity of a polymer with a high glass transition temperature (Tg) with a softer, lower molecular weight polymer that coalesces quickly and is flexible to maintain scrubbability are disclosed. Architectural compositions containing these film-forming polymers exhibit anti-blocking properties within one hour from being applied to a substrate.

18 Claims, No Drawings

MULTI-STAGE POLYMER WITH LOW MW SHELL AND HIGH TG CORE FOR EARLY BLOCK RESISTANCE

FIELD OF THE INVENTION

The present invention is directed to a polymer that combines the structural integrity of a polymer with a high glass transition temperature (Tg) with a softer, lower molecular weight polymer that coalesces quickly and is flexible to maintain scrubbability.

BACKGROUND OF THE INVENTION

An issue with painting architectural structures such as homes and commercial buildings is that when two freshly painted surfaces come into contact with each other these surfaces may adhere to each other. Hence, windows and frames or doors and jambs can become stuck to each other. When force is applied to open windows or doors, the paint films can peel away from the painted surfaces leaving unsightly patterns on the surfaces. This is known in the painting industry as blocking. A common measurement of blocking, e.g., ASTM D4946-89, is to rate the painted surfaces after 24 hours or after 7 days of drying, as discussed in U.S. Pat. Nos. 9,611,393, 10,301,501 and 10,273,378, among others.

Soft polymers, i.e., low Tg polymers, when incorporated in paints and stains exhibit higher blocking. Paints having a high gloss or sheen also show more blocking than lower gloss paints due to the higher resin content. Tackiness is a similar phenomenon that describes the tendency of dry paint on a surface to tack or to stick on a person or object that presses against the painted surface particular in a high humidity environment.

However, leaving painted surfaces for a day or seven days after painting to ascertain the level of blocking is impractical and does not approximate real-life situations. Hence, there remains a need for aqueous architectural compositions such as paints or stains that exhibit good blocking resistance when the compositions dry or soon after being applied to surfaces.

SUMMARY OF THE INVENTION

Hence, one embodiment of the present invention is directed to a multi-stage polymer having two or more stages. One stage preferably is a hard polymer and another stage preferably has a low molecular weight and lower Tg. A third stage may be a polymer with lower hardness or a medium hardness. The hardness of a stage can be achieved by polymerizing higher Tg monomers and by cross-linking, and the low molecular weight can be achieved by adding chain transfer agents (CTA) during polymerization. The hardness of a stage provides the blocking resistance for the paint film, and the lower MW and softer stage preferably contributes to the coalescence and film formation to achieve low temperature coalescence (LTC), preferably at temperature lower than about 50° F. (10° C.).

Preferably, the hard polymer forms the core and the low MW and softer polymer forms the shell. Alternatively, a less hard polymer is the inner core while a harder polymer is the outer core and a low MW and softer polymer makes up the outer shell. Preferably, different stages of a multi-stage polymer have different Tg and the stages can be differentiated by the different Tg.

In less preferred embodiment, the inventive latex resin is a single-stage polymer with a high Tg to have a sufficiently high minimum film forming temperature (MFFT) for sufficient blocking resistance while possessing LTC. During polymerization, an amount of monomer responsible for cross-linking is added to the early portion of the monomer feed, and CTA is added to the later portion of the monomer feed to reduce the molecular weight of the outer portion of the polymer, thereby creating a polymer with substantially the same Tg or having no distinct Tg differences from a harder inner portion to a lower MW and softer outer portion.

An embodiment of the present invention is directed to a copolymer multi-stage latex particle comprising at least a first stage and a second stage. The first stage comprises one or more film forming monomers copolymerized with at least one crosslinking monomer and having a calculated glass transition temperature (Tgc) from about 25° C. to about 100° C., preferably from about 25° C. to about 75° C., preferably from about 35° C. to about 60° C. The at least one crosslinking monomer ranges from about 1 wt. % to about 8 wt. % of the total monomers in the latex particle, preferably from about 2 wt. % to about 8 wt. %, preferably from about 3 wt. % to about 5 wt. %. The second stage comprises one or more film forming monomers copolymerizes with at least one chain transfer agent (CTA), wherein the CTA ranges from about 0.2 wt. % to about 2 wt. % of the total monomers in the latex particle, preferably from about 0.5 wt. % to about 1.5 wt. %, preferably from about 0.75 wt. % to about 1.25 wt. %. The weight average molecular weight of the second stage ranges from about 8,000 Daltons to about 30,000 Daltons, preferably from about 10,000 Daltons to about 25,000 Daltons, preferably from about 10,000 Daltons to about 20,000 Daltons. The Tgc of the first stage is higher than a Tgc of the second stage from about 45° C. to about 90° C., preferably from about 50° C. to about 80° C. higher, preferably from about 55° C. to about 75° C. higher. Preferably, the first stage is an inner stage and the second stage is an outer stage.

In this 2-stage embodiment, the weight percentage of the second stage ranges from about 40 wt. % to about 65 wt. %, and the weight percentage of the first stage ranges from about 20 wt. % to about 55 wt. %. Preferably, the weight percentage of the second stage ranges from about 45 wt. % to about 60 wt. %, and the weight percentage of the first stage ranges from about 25 wt. % to about 50 wt. %.

In another embodiment, the inventive copolymer multi-stage latex particle preferably further comprises an innermost stage inside of the first stage. In this 3-stage embodiment, the weight percentage of the innermost stage ranges from about 20 wt. % to about 50 wt. %, the weight percentage of the first stage ranges from about 15 wt. % to about 35 wt. % and the weight percentage of the second stage ranges from about 30 wt. % to about 50 wt. %. Preferably, the weight percentage of the innermost stage ranges from about 30 wt. % to about 40 wt. %, the weight percentage of the first stage ranges from about 20 wt. % to about 30 wt. % and the weight percentage of the second stage ranges from about 35 wt. % to about 45 wt. %. The other properties of the 3-stage embodiment are substantially similar to or substantially the same as those for the 2-stage embodiment.

Another embodiment of the present invention is directed to aqueous latex architectural compositions comprising the inventive 2-stage or 3-stage latex particle discussed herein, an optional opacifying pigment and a hydrazine or hydrazone compound to crosslink with the at least one crosslinking monomer.

DETAILED DESCRIPTION OF THE PREFERRED EMBODIMENTS

The present invention is directed to latex resins for aqueous architectural compositions, such as paints and stains, that form paint films that have good blocking resistance when the paints dry or soon thereafter, preferably within one hour after the paint is applied. The latex resins can be a preferred multi-stage polymer or a less preferred single-stage polymer. Advantageously, consumers can be assured that the paints or stains resist blocking soon after the paints or stains are applied.

The inventive polymeric latex resins can improve the blocking resistance of a paint film without the addition of anti-blocking additives. Commonly used anti-blocking additives include silicon based materials, fluoro-surfactants commercially available as Capstone™ FS family of surfactants, and waxes. During film formulations, these additives migrate to the surface of the film to form a release layer that reduces the intermingling of contacting resin films as described in "Fluoroadditives: Antiblock Characteristics in Architectural Paint Systems" PCI Paint & Coating Industry Magazine, 1 Oct. 2003. As shown in the Examples below, the inventive polymeric latex resins improve the anti-blocking property of the paint films without anti-blocking additives. It is anticipated that anti-blocking additives are used in conjunction with the inventive polymeric latex resins to maximize the paint films' blocking resistance.

Without being bound to any particular theory, the present inventors believe that for a multi-stage polymer, the core should be hard or having a high Tg or MFFT to provide good blocking resistance. Preferably, one or more monomers with crosslinking capability, such as diacetone acrylamide (DAAM), are added to the monomer mix for the core to provide resistance to scrubbing. The crosslinking monomer preferably crosslinks with a hydrazine or hydrazone compound present in the aqueous phase of the architectural coating. The present inventors also believe that the crosslinking monomers add structural integrity to the resin to boost or maintain the paint film's scrubbability. Additionally, omitting crosslinking monomers from the outer stage may keep the outer stage from reducing the paint film's cleanse-ability. The outer stage or the shell should have low molecular weight preferably by adding CTA into the polymerization of the outer stage, and the outer stage preferably has lower Tg or MFFT to provide good film coalescence and film formation. Lower MW monomer chains have better mobility and help the latex particles to coalesce faster to provide early block resistance.

When the multi-stage polymer has a third stage or more, which preferably is/are the innermost stage(s) and is/are softer than the hardest stage. The hardest stage is preferably smaller in size and weight, and is preferably sandwiched between a softer inner stage and a softer shell. The cross-linking monomer is preferably added to the monomer mixes for the innermost and/or the middle stages to improve scrubbability. The resulting polymer possesses good blocking resistance, scrubbability and good cleanse-ability. Preferably, the Tg for each of the stages of the multi-stage polymer would be distinct from each other.

Without being bound to any particular theory, the present inventors believe that for a single-stage polymer with substantially the same Tg throughout the polymer or Tg only gradually changing within the polymer, the hardness of the polymer varies from hard within the innermost region and becoming softer in the outermost region. The addition of CTA to the later part of the polymerization reduces the molecular weight of the polymer. This would mimic the structure and properties of the inventive multi-stage polymer.

The MFFT of the inventive polymer should be low enough for LTC, i.e., preferably less than about 15° C. or about 10° C., preferably less than about 5° C. or about 0° C. For multi-stage polymers, in the innermost region the monomer mix should have an amount of the crosslinking monomer to increase hardness, and in the outermost region CTA is added to reduce the MW for coalescence.

Tg can be readily calculated by Fox's equation, as discussed below, which aggregates the weight fraction of each monomer and the Tg of a mono-polymer made entirely from that monomer. As calculated, Tg generally does not include the hardness caused by the cross-linking of the polymer chains. The crosslinking monomer(s) when added to the monomer mixture typically is used in relatively low amounts, e.g., less than about 10 wt. %, discussed below The aggregated Tg of a co-polymer calculated by Fox's equation includes the individual Tg of various monomers being co-polymerized, as follows:

$$1/Tg_{agg} = Wf_1/Tg_1 + Wf_2/Tg_2 + Wf_x/Tg_x,$$

where $Tg_{agg}$ is the aggregated Tg of the co-polymer $Wf_x$ is the weight fraction of each monomer x $Tg_x$ is the Tg of a polymer made from the single monomer x x is the number of monomers in the co-polymer Differential scanning calorimetry (DSC) is a technique commonly used to measure experimentally the response of polymers to heating. DSC can be used to study the melting of a crystalline polymer or the glass transition to measure Tg. DSC can measure the hardness caused by crosslinking of the polymers resulting in higher Tg, as well as the hardness of the un-crosslinked polymers. The DSC set-up generally comprises a measurement chamber housing two pans and a computer to control the heating of the pans. The sample pan contains the material being investigated. A second pan, which can be empty, is used as a reference. The computer is used to monitor the temperature and regulate the rate at which the temperature of the pans changes. A typical heating rate is around 10° C./min. The rate of temperature change for a given amount of heat will differ between the two pans. This difference depends on the composition of the pan contents as well as physical changes such as phase changes. For the heat flux, the system generally varies the heat provided to one of the pans in order to keep the temperature of both pans the same. The difference in heat output of the two heaters is recorded. If a polymer in its solid state is heated it will at some point reach its Tg. At this point the mechanical properties of the polymer change from those of a brittle material to those of an elastic material due to changes in chain mobility. The heat capacity of the polymer is different before and after Tg. The heat capacity Cp of polymers is usually higher above Tg. It is important to note that the transition does not occur suddenly at one unique temperature but rather over a range of temperatures. The temperature in the middle of the inclined region is taken as the Tg. The glass transition results in a kink in the heat versus temperature plot due to the change in heat capacity. In a plot of heat flow versus temperature it is a gradual transition that occurs over a range of temperatures. The glass transition temperature is taken to be the middle of the sloped region. See generally polymerscience.physik.hu-berlin.de/docs/manuals/DSC.

The Tg values by DSC reported herein are measured with solid samples of the polymer without any of the crosslinking compounds such as hydrazine or hydrazone in the aqueous phase of the paints or stains that would crosslink with monomers such as DAAM. Hence, the Tg(DSC) reported are the Tg of the un-crosslinked polymers.

Tg of common film-forming monomers and of DAAM are listed below.

| Monomer | Tg (° C.) |
|---------|-----------|
| BA | −54 |
| 2-EHA | −50 |
| EA | −24 |
| MMA | 105 |
| MAA | 228 |
| Styrene | 100 |
| VA | 30 |
| DAAM | 85 |

The minimum film forming temperature (MFFT) is preferably measured by ISO 2115 (April 2001). Tg and MFFT are reported in degrees Celsius. Unless noted otherwise, the Tg values reported herein are calculated by Fox's equation. Unless indicated otherwise, molecular weights are weight average molecular weights ($MW_w$). All percentages are weight percentages (wt. %). Particle sizes or particle diameters, if any, are volume average particle sizes ($D_v$).

Suitable emulsion latex particles include but are not limited to acrylic, vinyl, vinyl-acrylic or styrene-acrylic polymers or copolymers. The latex particles coalesce and/or crosslink to form a paint film on a substrate. Latexes made principally from acrylic monomers are preferred for the present invention, as illustrated in the Examples below. Exemplary, non-limiting monomers suitable to form the emulsion latex particles for the present invention are described below.

Any (meth)acrylic monomers can be used in the present invention. Suitable (meth)acrylic monomers include, but are not limited to methyl (meth)acrylate, ethyl (meth)acrylate, butyl (meth)acrylate, iso-octyl (meth)acrylate, lauryl (meth) acrylate, 2-ethylhexyl (meth)acrylate, stearyl (meth)acrylate, isobornyl (meth)acrylate, methoxyethyl (meth)acrylate, 2-ethyloxyethyl (meth)acrylate, 2-hydroxyethyl (meth)acrylate, 2-hydroxybutyl (meth)acrylate, dimethylamino ethyl (meth)acrylate, diethylaminoethyl (meth)acrylate, dimethylaminopropyl (meth)acrylamide, alkyl (meth)acrylic acids, such as methyl (meth)acrylate acids, (meth)acrylic acids, wet adhesion monomers, such as N-(2-methacryloyloxyethyl)ethylene urea, and multifunctional monomers such as divinyl benzene, diacrylates, for crosslinking functions etc., acrylic acids, ionic acrylate salts, alkacrylic acids, ionic alkacrylate salts, haloacrylic acids, ionic haloacrylate salts, acrylamides, alkacrylamides, monoalkyl acrylamides, monoalkyl alkacrylamides, alkyl acrylates, alkyl alkacrylates, acrylonitrile, alkacrylonitriles, dialkyl acrylamides, dialkyl alkacrylamides, hydroxyalkyl acrylates, hydroxyalkyl alkacrylates, only partially esterified acrylate esters of alkylene glycols, only partially esterified acrylate esters of non-polymeric polyhydroxy compounds like glycerol, only partially esterified acrylate esters of polymeric polyhydroxy compounds, itaconic acid, itaconic mono and di-esters, and combinations thereof. The preferred alkyl (meth)acrylate monomers are methyl methacrylate and butyl acrylate.

Preferred monomers containing aromatic groups are styrene and α-methylstyrene. Other suitable monomers containing aromatic groups include, but are not limited to, 2,4-diphenyl-4-methyl-1-pentene, 2,4-dimethylstyrene, 2,4,6-trimethylstyrene, 2,3,4,5,6-pentafluorostyrene, (vinylbenzyl)trimethylammonium chloride, 2,6-dichlorostyrene, 2-fluorostyrene, 2-isopropenylaniline, 3(trifluoromethyl) styrene, 3-fluorostyrene, α-methylstyrene, 3-vinylbenzoic acid, 4-vinylbenzyl chloride, α-bromostyrene, 9-vinylanthracene, and combinations thereof.

Preferred monomers containing primary amide groups are (meth)acrylamides. Suitable monomers containing amide groups include, but are not limited to, N-vinylformamide, or any vinyl amide, N,N-dimethyl(meth)acrylamide, N-(1,1-dimethyl-3-oxobutyl)(meth)acrylamide, N-(hydroxymethyl) (meth)acrylamide, N-(3-methoxypropyl)(meth)acrylamide, N-(butoxymethyl) (meth)acrylamide, N-(isobutoxymethyl) acryl(meth)acrylamide, N-[tris (hydroxymethyl)methyl] acryl(meth)acrylamide, 7-[4-(trifluoromethyl)coumarin] (meth)acrylamide, 3-(3-fluorophenyl)-2-propenamide, 3-(4-methylphenyl) (meth)acrylamide, N-(tert-butyl)(meth) acrylamide, and combinations thereof. These monomers can be polymerized with acrylic monomers, listed above. General formula for vinyl(form)amides are:

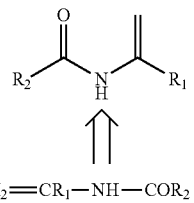

and (meth)acrylamides:

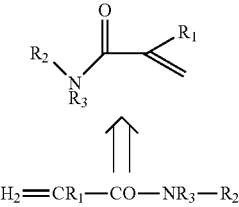

where R1 and R2 can be —H, —$CH_3$, —$CH_2CH_3$, and other substituted organic functional groups and R3 can by —H, an alkyl or an aryl.

In one embodiment, styrene monomers, such as styrene, methylstyrene, chlorostyrene, methoxystyrene and the like, are preferably co-polymerized with (meth)acrylamide monomers.

In one embodiment, the aqueous latex polymer may also comprise vinyl monomers. Monomers of this type suitable for use in accordance with the present invention include any compounds having vinyl functionality, i.e., —CH=$CH_2$ group. Preferably, the vinyl monomers are selected from the group consisting of vinyl esters, vinyl aromatic hydrocarbons, vinyl aliphatic hydrocarbons, vinyl alkyl ethers and mixtures thereof.

Suitable vinyl monomers include vinyl esters, such as, for example, vinyl acetate, vinyl propionate, vinyl laurate, vinyl pivalate, vinyl nonanoate, vinyl decanoate, vinyl neodecanoate, vinyl butyrates, vinyl caproate, vinyl benzoates, vinyl isopropyl acetates and similar vinyl esters; nitrile monomers, such (meth)acrylonitrile and the like; vinyl aromatic hydrocarbons, such as, for example, styrene, methyl styrenes and similar lower alkyl styrenes, chlorostyrene, vinyl toluene, vinyl naphthalene and divinyl benzene; vinyl aliphatic hydrocarbon monomers, such as, for example, vinyl chloride and vinylidene chloride as well as alpha olefins such as, for example, ethylene, propylene, isobutylene, as well as conjugated dienes such as 1,3-butadiene, methyl-2-butadiene, 1,3-piperylene, 2,3-dimethyl butadiene, isoprene, cyclohexene, cyclopentadiene, and dicyclopentadiene; and vinyl alkyl ethers, such as, for example, methyl vinyl ether, isopropyl vinyl ether, n-butyl vinyl ether, and isobutyl vinyl ether.

Suitable CTAs include but are not limited to monofunctional mercaptans such as monothiols or compounds having a sulfur-hydrogen (S—H) functionality. A preferred chain transfer agent is isooctyl 3-mercaptopropionate (iOMP), disclosed in commonly owned U.S. Pat. No. 7,642,314 to Gharapetian et al. The preferred iOMP ($C_{11}H_{22}O_2S$) chain transfer agent has the following structure:

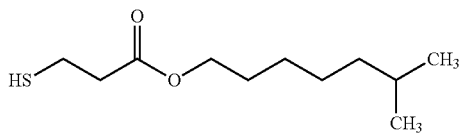

Other suitable mercaptan chain transfer include but are not limited to n-dodecyl mercaptan (n-DDM), t-dodecyl mercaptan, n-octyl mercaptan, t-octyl mercaptan, sec-octyl mercaptan, n-tetradecyl mercaptan, n-octadecyl mercaptan, n-hexyl mercaptan, n-amyl mercaptan, n-butyl mercaptan, t-butyl mercaptan, n-butyl 3-mercaptopropionate (BMP), methyl 3-mercaptopropionate, and the like, as well as mixtures thereof, disclosed in U.S. Pat. Nos. 4,593,081 and 7,256,226. The '081 patent further discloses other non-mercaptan chain transfer agents. All patent references cited in this paragraph are incorporated herein by reference in their entireties. n-DDM is another preferred chain transfer agent.

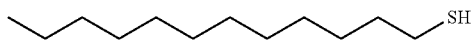

As discussed above, the latex particles may have a cross-linking monomer added to the monomer mixtures for an inner stage, such as the core or the two inner cores/stages or in the first portion of the monomer mixture. Cross-linking can improve the toughness of the dried paint film, e.g., to improve its resistance to scrubbing or to have improved scrubbability. A suitable self-crosslinking moiety is formed by monomers, such as diacetone acrylamide ("DAAM") and suitable cross-linking agents include adipic acid dihydrazide ("ADH").

Suitable crosslinking monomers include but are not limited to DAAM, diacetone methacrylamide (DAMAM), acetoacetoxyethyl methacrylate (AAEM), allyl methyl acrylate (AMA) and/or 1,4-butanediol diacrylate, which is/are added to the pre-emulsion composition and can be co-polymerized with film forming monomers to form latex particles.

It has been reported that the cross-linking of polymers comprising DAAM with ADH cross-linking agent through a keto-hydrazide reaction has a substantial reaction rate in an aqueous solution. ("The diacetone acrylamide cross-linking reaction and its influence on the film formation of an acrylic latex", Journal of Coatings Technology and Research, 5(3), 285-297, 2008.) To minimize this premature cross-linking, the ADH hydrazine is substantially substituted with hydrazone(s) or blocked hydrazine particles discussed in commonly owned United States published patent application No. 2012/0142847 and in commonly owned U.S. Pat. No. 9,040, 617, which are incorporated herein by reference in their entireties. The hydrazone crosslinking particles do not react with the DAAM moiety during storage, and are converted to hydrazine crosslinking particles when the aqueous component evaporates after application to a substrate.

Another way to minimize premature cross-linking during storage is to substantially remove the hydrazine (ADH) cross-linking agents and to introduce a second crosslinkable moiety, such as methacrylamide (MAM) and/or acrylamide (AM) monomer, on the latex particles. This second cross-linkable monomer is copolymerized as part of the latex particles and functions as another self-crosslinking moiety to the film forming latex particles. A small amount of hydrazine cross-linking agent, e.g., below its stoichiometric ratio with DAAM, can remain in the aqueous phase. Latex particles with multiple crosslinkable moieties are disclosed in commonly owned United States published patent application Nos. US 2014/0323635, and US 2014/0228514.

Also suitable are pre-crosslinking monomers, such as diethylene glycol dimethacrylate (DEGDMA), ethylene glycol dimethacrylate (EGDMA) and 1,3-butylene glycol diacrylate (BGDA), which crosslink during polymerization.

Additives including surfactants, initiators, chaser solutions, biocides, rheological modifiers, etc., can be added to the polymerization process.

Examples of surfactants useful in the polymerization process may include, but are not limited to, nonionic and/or anionic surfactants such as ammonium nonoxynol-4 sulfate, nonylphenol (10) ethoxylate, nonylphenol (~10 mol %) ethoxylate, nonylphenol (~40 mol %) ethoxylate, octylphenol (~40 mol %) ethoxylate, octylphenol (9-10) ethoxylate, sodium dodecyl sulfonate, sodium tetradecyl sulfonate, sodium hexadecyl sulfonate, polyether phosphate esters, alcohol ethoxylate phosphate esters, those compounds sold under the tradename Triton™ (e.g., QS series, CF series, X series, and the like), those compounds sold under the tradename Rhodapon™, those sold under the tradename Rhodapex™, those compounds sold under the tradename Rhodacal™, those compounds sold under the tradename Rhodafac™, and the like, and combinations thereof.

Examples of initiators and chaser solutions useful in the polymerization process may include, but are not limited to, ammonium persulfate, sodium persulfate (SPS), azo initiators such as azoisobutyronitrile, redox systems such as sodium hydroxymethanesulfinate (sodium formaldehyde sulfoxylate; reducer) and t-butyl-hydroperoxide (oxidizer), and the like, and combinations thereof, typically in an aqueous solution. Either or both of these components can optionally contain an additional surfactant and/or a pH adjuster, if desired to stabilize the emulsion.

Examples of pH adjusters useful in the polymerization process may include, but are not limited to, ammonium hydroxide, sodium hydroxide, sodium carbonate, sodium bicarbonate, potassium hydroxide, potassium carbonate, potassium bicarbonate, ammonia, amines such as trimethylamine, triethylamine, dimethylaminoethanol, diethylaminoethanol, AMP-95 and the like, and combinations thereof. In certain cases, compounds that qualify as pH adjusters can be added for purposes other than adjusting pH, e.g., emulsion stabilization, and yet are still characterized herein as pH adjusters.

Preferably, the latex emulsion polymers are chased with a redox (reducing agent and oxidation agent) pair to reduce the odor and to neutralize the unreacted monomers without performing the lengthy or time-consuming stripping step and requiring additional stripping equipment.

Suitable oxidizing agents include but are not limited to water-soluble hydroperoxides, tertiary butyl hydroperoxide, cumene hydroperoxide, hydrogen peroxide, sodium peroxide, potassium peroxide, sodium perborate, potassium persulfate, sodium persulfate, ammonium persulfate, persulfuric acid and salts thereof, perphosphoric acid and salts thereof, potassium permanganate, and an ammonium or alkali salt of peroxydisulfuric acid. A preferred oxidizing agent is tertiary butyl hydroperoxide (tBHP).

Suitable reducing agents include but are not limited to sodium formaldehyde sulfoxylate (SFS), ascorbic acid, isoascorbic acid, organic compounds containing thiol or disulfide groups, reducing inorganic alkali and ammonium salts of sulfur-containing acids, such as sodium sulfite, disulfite, thiosulfate, hydrosulfite, sulfide, hydrosulfide or dithionite, formadinesulfinic acid, hydroxymethanesulfonic acid, acetone bisulfite, amines, such as ethanolamine, glycolic acid, glyoxylic acid hydrate, lactic acid, glyceric acid, malic acid and tartaric acid. Preferred reducing agents include formaldehyde-free SFS and sodium salt of an organic sulfinic acid derivative.

The following non-limiting emulsion examples illustrate the polymerization of the inventive latex particles. In Examples 1-2, different amounts of a same set of monomers were used for all the stages in the polymer to achieve several distinct Tg stages. However, different combinations of monomers can be used to achieve different stages. For polymers with at least three stages, the Tg for the innermost core is generally not detectable by DSC when the stage comprises a small percentage of the total monomer weight of the polymer or when the change in phase is small, and is therefore calculated by Fox's equation. The Tg for the other two stages and the Tg for two-stage polymers are measurable by DSC. In Examples 1-2, a crosslinking monomer such as DAAM was incorporated in the core or both cores, and a CTA such as iOMP was included in the shell stage. In Example 3, which is a single-stage polymer, the crosslinking monomer was added to the monomer mixture at the beginning of the polymerization and CTA was added to the monomer mixture toward the end of the polymerization.

Example 1

3-Stage Polymer

Charge de-ionized water, surfactant, buffer to reactor and heat to 80° C. Prepare monomer pre-emulsion mixtures for core 1, core 2, and shell, separately. Charge seed to reactor (13% of core 1 pre-emulsion monomer mix) and initiator solution 1, hold 15 minutes, then feed rest of core 1 monomer mix into reactor. Once the monomers of core 1 is completely reacted, feed core 2 pre-emulsion monomer mix, followed by the shell pre-emulsion monomer mix. Total feed time is 3.5 hours. Hold time is 30 minutes. Then add chasers at 55-60° C. dropwise over 30 minutes. Cool to 35° C., neutralize with ammonia, then add biocide solution.

|  | total (g) | % solids | Amt. solids |
|---|---|---|---|
| DW | 650 | 0% | 0 |
| emulsifier | 14.0 | 25% | 3.50 |
| buffer | 1.30 | 100% | 1.30 |
| initiator | 2.2 | 100% | 2.2 |
| DW | 16.7 | 0% | 0 |

|  | Core 1 | | | Core 2 | | Shell | |
|---|---|---|---|---|---|---|---|
| DW | 132.3 | 0% | 0 | 94.5 | 0 | 151.2 | 0 |
| DAAM | 26.2 | 100% | 26.2 | 18.8 | 18.8 | 0 | 0 |
| emulsifier | 12.6 | 25% | 3.2 | 9.0 | 2.25 | 14.5 | 3.63 |
| wetting agent | 3.6 | 45% | 1.60 | 2.5 | 1.139 | 4.05 | 1.82 |
| MEEU | 9.1 | 50% | 4.55 | 6.5 | 3.263 | 10.44 | 5.22 |
| MMA | 218.6 | 100% | 218.6 | 192.4 | 192.4 | 178.4 | 178 |
| 2EHA | 171.7 | 100% | 171.7 | 86.5 | 86.5 | 267.6 | 268 |
| MAA | 4.7 | 100% | 4.7 | 3.38 | 3.375 | 5.4 | 5.4 |
| $NH_3$ | 1.4 | 28% | 0.39 | 1.0 | 0.28 | 1.6 | 0.45 |
| iOMP | 0 | 100% | 0.00 | 0 | 0.00 | 11.1 | 11.1 |
| initiator | 0.32 | 100% | 0.32 | 0.23 | 0.23 | 0.36 | 0.36 |
| DW | 7 | 0% | 0 | 7 | 0 | 10 | 0 |
| DW rinse | 40 | 0% | 0 | | | | |
| oxidizer | 2.20 | 100% | 2.2 | | | | |
| DW | 33.40 | 0% | 0 | | | | |
| reducer | 2.20 | 100% | 2.2 | | | | |
| DW | 33.40 | 0% | 0 | | | | |
| $NH_3$ | 4.5 | 28% | 1.26 | | | | |
| biocide | 4.5 | 100% | 4.5 | | | | |
| DW | 7.5 | 0% | 0 | | | | |

Total Latex:

| total (g) | 2475.9 |
|---|---|
| total (g) solids | 1230.6 |
| % solids | 49.70% |
| % total DAAM | 4.04% |
| % surfactant = | 1.50% |

DW is deionized water; emulsifier is a phosphate ester; buffer is sodium bicarbonate; initiator is a sodium persulfate (SPS); wetting agent is a neutralized alcohol phosphate; oxidizer is tertiary butyl hydroperoxide (tBHP) oxidizing agent; reducer is a sodium salt of an organic sulfinic acid derivative; and MEEU is N-(2-methacryloyloxyethyl)-ethylene urea and functions as a wet adhesion monomer.

The weight percentages for the stages are 35 wt. % for core 1, 25 wt. % for core 2 and 40 wt. % for shell. The Tg are 20° C. (Fox) for core 1, 50° C. (DSC) for core 2 and −6° C. (DSC) for shell.

Example 2

2-Stage Polymer

Charge de-ionized water, surfactant, buffer to reactor and heat to 80° C. Prepare monomer pre-emulsion mixtures for core and shell separately. Charge seed to reactor (6% of core pre-emulsion) and initiator solution 1, hold 15 minutes, then feed rest of core pre-emulsion monomer mixture into reactor. Once core is completely reacted, feed the shell pre-emulsion monomer mixtures. Total feed time is 3.5 hours. Hold time is 30 minutes. Then add chasers at 55-60° C. dropwise over 30 minutes. Cool to 35° C., neutralize with ammonia, then add biocide solution.

|  | total (g) | % solids | Amt. solids |  |  |
|---|---|---|---|---|---|
| DW | 975 | 0% | 0 |  |  |
| emulsifier | 21 | 25% | 5.25 |  |  |
| buffer | 1.95 | 100% | 1.95 |  |  |
|  |  |  | 0 |  |  |
| initiator | 3.3 | 100% | 3.3 |  |  |
| DW | 25.05 | 0% | 0 |  |  |
|  | Core |  |  | Shell |  |
| DW | 283.5 | 0% | 0 | 283.5 | 0 |
| DAAM | 67.5 | 100% | 67.5 | 0 | 0 |
| emulsifier | 27 | 25% | 6.8 | 27 | 6.75 |
| wetting agent | 7.65 | 45% | 3.44 | 7.65 | 3.4425 |
| MEEU | 19.6 | 50% | 9.788 | 19.575 | 9.7875 |
| MMA | 577.2 | 100% | 577.2 | 334.5 | 334.5 |
| 2EHA | 259.4 | 100% | 259.4 | 501.8 | 501.75 |
| MAA | 10.13 | 100% | 10.13 | 10.1 | 10.125 |
| $NH_3$ | 3 | 28% | 0.84 | 3 | 0.84 |
| iOMP | 0 | 100% | 0.00 | 16.6 | 16.65 |
| initiator | 0.68 | 100% | 0.675 | 0.68 | 0.675 |
| DW | 21 | 0% | 0 | 15 | 0 |
| DW rinse | 60 | 0% | 0 |  |  |
| oxidizer | 3.3 | 100% | 3.3 |  |  |
| DW | 50.1 | 0% | 0 |  |  |
| reducer | 3.3 | 100% | 3.3 |  |  |
| DW | 50.1 | 0% | 0 |  |  |
| $NH_3$ | 7.8 | 28% | 2.142 |  |  |
| biocide | 6.8 | 100% | 6.75 |  |  |
| DW | 11.3 | 0% | 0 |  |  |

| Total Latex: | |
|---|---|
| total (g) | 3714.75 |
| total (g) solids | 1846.18 |
| % solids = | 49.70% |
| % surfactant = | 1.50% |
| total active monomer = | 1712.6 |

The weight percentages for the stages are 50 wt. % for the core, and 50 wt. % for shell. The Tg are 50° C. (DSC) for the core and −6° C. (DSC) for shell.

Example 3

1-Stage Polymer

Charge de-ionized water, surfactant, buffer to reactor and heat to 80° C. Prepare monomer pre-emulsion mixture without DAAM cross-linker or iOMP chain transfer agent. Charge seed to reactor (4.8% of total pre-emulsion mixture) and initiator solution 1, hold 15 minutes, then feed rest of emulsion. Feed DAAM solution into the first 70% of the pre-emulsion. Feed iOMP into the last 30% of the pre-emulsion. Total feed time is 3.5 hours. Hold 30 minutes. Then add chasers at 55-60° C. dropwise over 30 minutes. Cool to 35° C., neutralize with ammonia, then add biocide solution.

|  | total (g) | % solids | Amt. Solids |
|---|---|---|---|
| DW | 560 | 0% | 0 |
| emulsifier2 | 5.0 | 40% | 2.00 |
| buffer | 1.30 | 100% | 1.3 |
| initiator | 2.2 | 100% | 2.2 |
| DW | 16.7 | 0% | 0 |
| DW | 378 | 0% | 0 |
| emulsifier2 | 26 | 40% | 10.4 |
| emulsifier | 20 | 25% | 5.00 |
| MEEU | 26.1 | 50% | 13.05 |
| MMA | 644.5 | 100% | 644.5 |
| 2EHA | 470.5 | 100% | 470.5 |
| MAA | 13.5 | 100% | 13.5 |
| $NH_3$ | 4 | 28% | 1.12 |
| DAAM | 45 | 100% | 45.00 |
| DW | 45 | 0% | 0.00 |
| iOMP | 6.7 | 100% | 6.70 |
| Initiator | 0.9 | 100% | 0.9 |
| DW | 24.1 | 0% | 0 |
| DW rinse | 40 | 0% | 0 |
| oxidizer | 2.20 | 100% | 2.2 |
| DW | 33.40 | 0% | 0 |
| Reducer | 2.20 | 100% | 2.2 |
| DW | 33.40 | 0% | 0 |
| $NH_3$ | 4.5 | 28% | 1.26 |
| biocide | 4.5 | 100% | 4.5 |
| DW | 7.5 | 0% | 0 |

| Total Latex: | |
|---|---|
| total (g) | 2417.20 |
| total (g) solids | 1226.33 |
| % solids = | 50.73% |
| % surfactant = | 1.52% |
| total active monomer = | 1141.55 |

In this example, the emulsifier 2 is sodium alpha olefin sulfonate.

The Tg of the single-stage latex is about 20° C. (DSC).

For the present invention, which is directed to blocking resistance at a short time after the paints are applied, the standard blocking test (ASTM D4946-89) was modified to shorter elapsed time after paint application and a different numerical scale was chosen, as follows:

1. Draw down the paint composition over a white panel with a 3-mil bar and let dry in a controlled temperature (77° F. or 25° C.) and controlled humidity (50%) (CTCH) for 1 hour.
2. Cut 1-inch×1-inch squares and arrange the squares so that the painted surfaces face each other.
3. Place a 1-inch×1-inch×1-inch block weighing 100 grams-force over the squares for 3 hours at CTCH and for 3 hours in a 120° F. (49° C.) oven.
4. Remove the weight and let the squares stand at RT (77° F.) for 30 minutes.
5. Pull the squares apart.
6. Rate the blocking resistance, as follows:
   1. paint film transferred; indicate % of paint transferred,
   2. heavy tack; no paint transferred,
   3. moderate tack; no paint transferred,
   4. light tack; no paint transferred, and
   5. no tack; no paint transferred.
7. Repeat steps 2-6 two more times.
8. Average the three measurements.

Examples of inventive 1-stage, 2-stage and 3-stage polymers were polymerized similar to those shown in Examples 1-3. DAAM and iOMP were used in the following examples. The inventive polymers were used in both untinted and tinted paints. As used herein, untinted paints include paints that have binder resin and opacifying pigment, such as $TiO_2$, except for 4-base pastel paints and the optional extender pigments and additives. Untinted paints are suitable to coat/paint walls on architectural structures, such as homes, adobes and commercial buildings. Untinted paints are typically white due to the presence of the opacifying pigment. Tinted paints are untinted paints with colorants added to achieve the final color that the customers want. Colorants typically contain additional thickeners, rheological modifiers and polymeric surfactants, which can increase the paint films' tendency to block. Anti-blocking tests using tinted paints are more difficult to pass and are included to show enhanced ability of the inventive polymeric latex resin to resist blocking. As discussed above, the paints used in the tests reported below did not contain any anti-blocking additives.

TABLE 1

Performance data and results for the 3-stage polymers in untinted paints.

| Polymer # | 1-hour blocking | | | | | | | |
|---|---|---|---|---|---|---|---|---|
| | 77° F. | | | Avg. | 120° F. | | | Avg. |
| Inventive 1 | 4 | 4 | 4.5 | 4.2 | 3 | 3.5 | 4 | 3.5 |
| Inventive 2 | 4.5 | 4 | 4.5 | 4.3 | 3 | 3 | 4 | 3.3 |
| Inventive 3 | 4 | 4 | 4 | 4 | 4 | 4 | 4 | 4 |

| Polymer # | Cleanse-ability | | | | | | |
|---|---|---|---|---|---|---|---|
| | scrubs | g | k | m | w | c | total | Litter/TTP |
| Inventive 1 | 538 | 0.46 | 0.54 | 0.35 | 1.63 | 1.34 | 4.32 | 1.09/0.65 |
| Inventive 2 | 765 | 0.11 | 0.34 | 0.34 | 0.89 | 1.33 | 3.01 | 0.93/0.31 |
| Inventive 3 | 675 | 0.03 | 0.21 | 0.17 | 1.53 | 0.81 | 2.75 | 1.09/0.41 |

TABLE 2

Properties of the 3-stage polymers

| Polymer # | Core 1 | | Core 2 | | Shell | | MFFT | Crosslinker (core 1 and 2) | CTA (shell) |
|---|---|---|---|---|---|---|---|---|---|
| | Ratio | Tg | Ratio | Tg | Ratio | Tg | | | |
| Inventive 1 | 25% | 20 | 25% | 50 | 50% | −8 | 4-6 | 4% | 1% |
| Inventive 2 | 35% | 20 | 25% | 50 | 40% | −8 | 10-12 | 4% | 1% |
| Inventive 3 | 35% | 20 | 25% | 50 | 40% | −8 | 12-15 | 4% | 1% |

The Tg of core 2 and shell are measured (by DSC). The Tg of core 1 is calculated (by Fox's equation) since it does not appear on a DSC scan. The calculated Tg (Fox) for Core 2 is 38° C. Tg (DSC) is about 12° C. higher than Tg (Fox). The calculated Tg (Fox) for Shell is −6° C. Tg (DSC) is about 2° C. lower than Tg (Fox).

The blocking resistance results for the inventive 3-stage polymer show that after 1 hour of drying at room temperature or 77° F. the painted surfaces exhibited only light tacking or better, and at an elevated temperature of 120° F. the painted surfaces only show light to somewhat moderate tacking. The scrubbability of the paint films are lower than the normal ranges but remains acceptable. The scrubbability tests were conducted 7 days after the paint films were dried. The paint films are readily cleanse-able with a total score of less than 6. Higher values indicate that the stains were more difficult to remove from the paint film, and lower values are preferred. The numbers reported are the sum of the changes in color readings (Delta E values in CIE2000 units) of a pre-stained paint film and post-stained-and-washed paint film after a number of different stains (coffee, red cooking wine, tomato ketchup, yellow mustard and graphite) are applied to the paint film. The stain test presented also includes a TTP stain, which comprises raw umber, white petroleum jelly and mineral spirits, and a litter stain, which comprises lanolin, petroleum jelly, carbon black and mineral oil. Lower litter and TTP scores are preferred.

TABLE 3

Performance data and results for the 2-stage polymers in tinted paints.

| polymer # | 1-hour blocking: tinted with red oxide colorant | | | | | | | |
|---|---|---|---|---|---|---|---|---|
| | 77° F. | | | Avg. | 120° F. | | | Avg. |
| Inventive 4 | 4 | 4 | 4.5 | 4.2 | 2 | 3 | 3 | 2.7 |
| Inventive 5 | 4 | 4 | 4 | 4 | 3 | 3 | 3 | 3 |
| Inventive 6 | 4.5 | 4.5 | 4.5 | 4.5 | 3 | 3 | 3 | 3 |
| Control 1 | 3 | 3 | 3 | 3 | 1(10%) | 1(20%) | 1(10%) | 1(10%) |

| Polymer # | scrubs | Total Cleanse-ability | Litter/TTP |
|---|---|---|---|
| Inventive 4 | 342 | 2.93 | 0.70/0.32 |
| Inventive 5 | 492 | 2.90 | 0.87/1.12 |
| Inventive 6 | 208 | 3.83 | 0.68/0.60 |
| Control 1 | 663 | 3.73 | 0.81/0.24 |

TABLE 4

Properties of the 2-stage polymers

| | Core | | Shell | | | X-linker | CTA |
|---|---|---|---|---|---|---|---|
| Polymer # | Ratio | Tg | Ratio | Tg | MFFT | (core) | (shell) |
| Inventive 4 | 40% | 50 | 60% | −8 | <0 | 4% | 1% |
| Inventive 5 | 50% | 50 | 50% | −8 | 17-19 | 4% | 1% |
| Inventive 6 | 40% | 63 | 60% | −8 | 2-4 | 4% | 1% |
| Control 1 | 40% | 50 | 60% | −8 | <0 | 4% | 0 |

The Tg for the core and shell are measured by DSC. The Tg(DSC) of 50° C. also corresponds to a Tg(Fox) of 38° C. The Tg(DSC) of 63° C. corresponds to a Tg(Fox) of 55° C.

Tables 3 and 4 illustrate the advantages of having CTA in the shell of a 2-stage polymer e.g., about 1% of iOMP in the shell in combination with a crosslinking monomer in the core, e.g., about 4% of DAAM in the core. The 1-hour block resistance at 77° F. is 4.0-4.5 (light tack-no tack), and the 1-hour block resistance at the elevated 120° F. is 3 (moderate tack). These examples include a control 2-stage polymer that has the crosslinking monomer in the core but no CIA in the shell. The Tg of both core and shell are similar to that of the inventive examples. The blocking resistance is significantly improved. The 1-hour block resistance at 77° F. improves substantially from 3 (moderate tack) to 4.0-4.5 (light tack-no tack), and the 1-hour block resistance at 120° F. improves substantially from 1 (10% paint film transfer) to 3 (moderate tack). These examples show the advantages of using CTA in the outermost stage.

The present inventors believe that while the scrubbability of Inventive Examples 4 and 6 are not as high as the scrubbability of the other Inventive Examples, adding more crosslinking monomer, such as DAAM, to the core that would crosslink with the hydrazine or hydrozone crosslinking compound during film formation could improve the resistance to scrubbing. Moreover, as shown in Examples 1-3 adding an inner core stage improves scrubbability and blocking resistance.

The molecular weight for the shell of the inventive block resistant polymer have been calculated using gel permeation chromatography (GPC) data on substantially the same polymers as 11,612 and 17,688 Daltons. GPC is discussed in commonly owned U.S. Pat. No. 8,895,658, which is incorporated herein in its entirety. The preferred molecular weight for the shell or the outermost stage ranges from about 8,000 Daltons to about 30,000 Daltons, and preferably from about 10,000 Daltons to about 25,000 Daltons, or preferably from about 10,000 Daltons to about 20,000 Daltons. As stated above, the molecular weights are reported as weight average molecular weight.

TABLE 5

Performance data and results for the less preferred single stage polymers in untinted paints.

| Polymer # | 1-hour blocking | | | | | | | |
|---|---|---|---|---|---|---|---|---|
| | 77° F. | | | Avg. | 120° F. | | | Avg. |
| Inventive 7 | 3 | 4 | 3 | 3.3 | 1 (40%) | 1 (10%) | 1 (5%) | 1 (20%) |
| Control 2 | | | | 1 (<5%) | | | | 1 (90%) |

| polymer | scrubs | Cleanse-ability | Litter/TTP |
|---|---|---|---|
| Inventive 7 | 1241 | 3.29 | 0.68/0.29 |
| Control 2 | 985 | 1.97 | 0.53/0.46 |

TABLE 6

Properties of the single stage polymers

| Poly # | Tg (Fox) | Tg (DSC) | MFFT | Crosslinker | CTA |
|---|---|---|---|---|---|
| Inventive 7 | 19 | 24 | 18-19 | 4% DAAM in the inner 70% | 2% of monomer in the outer 30% |
| Control 2 | 19 | | 21-22 | None | None |

The inventive example of the single-stage polymer shows that the difference between the Tg(Fox) and Tg(DSC) was 5° C. The blocking resistance is better than Control 2, which has no crosslinking monomer and no CTA, at both temperatures and is better than Control 3, which has more crosslinking monomer and no CTA, at the higher temperature.

TABLE 7

Comparative Examples of 2-stage Polymers in Untinted Paints

| latex # | 1-hour blocking | | Core | | Shell | | MFFT | X-linker | CTA (shell) |
|---|---|---|---|---|---|---|---|---|---|
| | 77 F. | 120 F. | Ratio | Tg | Ratio | Tg | | | |
| Control 3 | 1 (30%) | 1 (100%) | 55% | 50 | 45% | −8 | 22.5 | None | None |
| Control 4 | 3.3 | 1 (90%) | 55% | 50 | 45% | −8 | 20 | None | 0.5% |

Monomers: MMA, 2EHA and styrene.

Controls 3 and 4 are 2-stage polymers and have no crosslinking monomer and Control 4 has a small amount of CTA in the shell. Neither has acceptable blocking resistance at the elevated temperature; however, Control 4 even with no crosslinking monomer in the core and only a low amount of CTA in the shell shows acceptable blocking resistance (no paint transfer) at room temperature over Control 3. These comparative examples show the efficacy of CTA in the shell and high core Tg.

The present inventors also discovered that the crosslinking monomers, such as DAAM, in addition to providing crosslinking in the inner stages or inner portion also maintain the scrubbability of the paint films.

The preferred amounts of components in the inventive polymer latex resins based on the examples and tests are as follows. The amount of CTA in the entire polymer, such as those within the outer shell, or in a single-phase polymer is from about 0.2 wt. % to about 2.0 wt. %, preferably from about 0.5 wt. % to about 1.5 wt. %, more preferably from about 0.75 wt. % to about 1.25 wt. % of the entire polymer.

The amount of crosslinking monomer to be incorporated into the entire multi-stage or core-shell polymer, such as those within one or more core stages, or into the single-stage polymer ranges from about 1 wt. % to about 8 wt. %, preferably from about 2 wt. % to about 7 wt. %, and more preferably from about 3 wt. % to about 5 wt. % of the entire polymer.

The weight percentage of the soft, low MW outermost stage ranges from about 40 wt. % to about 65 wt. %, preferably from about 45 wt. % to about 60 wt. %. The weight percentage of the hardest inner stage ranges from about 20 wt. % to about 55 wt. %, preferably from about 25 wt. % to about 50 wt. %.

When there are three stages, the third stage is the innermost stage and makes up about from 20 wt. % to about 50 wt. %, preferably 30 wt. % to about 40 wt. %. The weight percentage of the hardest inner stage ranges from about 15 wt. % to about 35 wt. %, preferably from about 20 wt. % to about 30 wt. %. The soft, low MW outermost stage ranges from about 30 wt. % to about 50 wt. %, preferably from about 35 wt. % to about 45 wt. %.

The Tg values of the inventive polymers are defined as Tg(DSC) or Tgm (measured Tg) and as Tg(Fox) or Tgc (calculated Tg). For multi-stage polymers, including 2-stage, 3-stage and 3+-stage polymers, the hardest stage within the polymers is one of the inner stage(s), i.e., not the outermost shell. The hardest stage may be the innermost core or one of the intermediate stages. The Tgc for the hardest stage ranges from about 25° C. to about 100° C., preferably from about 25° C. to about 75° C. and preferably from about 35° C. to about 60° C. The Tgm for the hardest stage ranges from about 30° C. to about 120° C., preferably from about 40° C. to about 100° C. and preferably from about 45° C. to about 80° C.

The Tgc or Tgm of the outermost stage or shell is preferable from about 45° C. to about 90° C. less than the Tgc or Tgm of the hardest stage, respectively, preferably from about 50° C. to about 80° C. less, preferably from about 55° C. to about 75° C. less.

The Tgm of the outermost stage is preferably less than about 5° C., preferably less than about 0° C. and preferably less than −5° C., and higher than about −25° C. The Tgc of the outermost stage is preferably less than about 0° C., preferably less than about −5° C. and preferably less than about −10° C. and higher than about −35° C.

The present invention can be defined with either Tg(Fox)/Tgc or Tg(DSC)/Tgm, so long as the Tg is used consistently.

As stated above, the weight average molecular weight of the outermost stage or softest stage ranges from about 8,000 Daltons to about 30,000 Daltons, and preferably from about 10,000 Daltons to about 25,000 Daltons, or preferably from about 10,000 Daltons to about 20,000 Daltons.

The scrubbability number means the number of cycles of scrubbing before the paint film fails, and the higher scrubbability number means higher resistance to scrubbing. Scrubbability test results show the number of scrub cycles before failure and the test is conducted pursuant to ASTM D2486 Method B.

The stain removal test conducted in these experiments including the type of stains is described above and is similar to the Master Paint Institute (MPI) COR-MTD-119 standard. Higher values indicate that the stains were more difficult to remove from the paint film. Lower values are more preferred. The numbers reported are the sum of the changes in color readings (Delta E values in CIE2000 units) of a pre-stained paint film and post-stained-and-washed paint film after a number of different stains are applied to the paint film. The stains include hot regular coffee, red cooking wine, tomato ketchup, yellow mustard and graphite. The cleaning solution comprises 0.5% nonyl phenoxy ethanol, 0.25% trisodium phosphate (TSP) and 99.25% deionized water. The cleaning solution is applied by a 430 g sponge/holder for 500 cycles. The changes of color caused by each stain are added and reported for each Example. Alternatively, a less preferred and less stringent stain removal test, MPI COR-MTD-083, can also be used.

The total number in the stain test is the combination of measured stains caused by the various common substances. The lower stain number means less stains were measured and means better stain resistance. The stain resistance values reported herein are less than 6.0 for the controls and inventive samples and are within the acceptable range. Preferably, stain resistance values of less than 8.0, more preferably less than 7.0 and more preferably less than 6.0 are acceptable.

The stain test presented also includes a TTP stain, which comprises raw umber, white petroleum jelly and mineral spirits, and a litter stain, which comprises lanolin, petroleum jelly, carbon black and mineral oil. Lower litter and TTP scores, e.g., ΔE values of less than about 1.5 DE2000, or less than 1.25 DE2000 units are preferred.

In the LTC test, paint is applied at various thicknesses, e.g., from 3 mils to 12 mils (1 mil=1/1000 inch). The thickness at which the paint film cracks is the failure point. The LTC is the highest thickness in mils that a paint film without cracks is obtained. The higher the LTC value the better the coalescence, and the least amount of external plasticizer or coalescing agent is needed for film formation. LTC is used to determine the comparative coalescence of a series of latex paints by noticing how samples are dried at standard and low temperatures. Coalescence is the formation of a film of resinous or polymeric material when water evaporates from an emulsion or latex system, permitting contact and fusion of adjacent latex particles. Thus, this test evaluates the paint film formation under standard and low temperature. Cracking indicates a poor film formation. Alternatively, the LTC test may be conducted in accordance to ASTM D3793.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. A copolymer multi-stage latex particle comprising a first stage and a second stage,
   wherein the first stage comprises one or more film forming monomers copolymerized with at least one cross-linking monomer and having a calculated glass transition temperature (Tgc) from about 25° C. to about 100° C., wherein the at least one crosslinking monomer ranges from about 1 wt. % to about 8 wt. % of the total monomers in the latex particle,
   wherein the second stage comprises one or more film forming monomers copolymerizes with at least one chain transfer agent (CTA), wherein the CTA ranges from about 0.2 wt. % to about 2 wt. % of the total monomers in the latex particle, wherein the weight average molecular weight of the second stage ranges from about 8,000 Daltons to about 30,000 Daltons, wherein the CTA is distributed throughout the second stage, and wherein the weight percentage of the second stage ranges from about 40 wt. % to about 65 wt. %, wherein the Tgc of the first stage is higher than a Tgc of the second stage from about 45° C. to about 90° C.

wherein the first stage is an inner stage and the second stage is an outer stage.

2. The copolymer multi-stage latex particle of claim 1 further comprises an innermost stage inside of the first stage.

3. The copolymer multi-stage latex particle of claim 1, wherein the cross-linking monomer ranges from about 2 wt. % to about 8 wt. %.

4. The copolymer multi-stage latex particle of claim 3, wherein the cross-linking monomer ranges from about 3 wt. % to about 5 wt. %.

5. The copolymer multi-stage latex particle of claim 1, wherein the CTA ranges from about 0.5 wt. % to about 1.5 wt. %.

6. The copolymer multi-stage latex particle of claim 5, wherein the CTA ranges from about 0.75 wt. % to about 1.25 wt. %.

7. The copolymer multi-stage latex particle of claim 1, wherein the Tgc of the first stage ranges from about 25° C. to about 75° C.

8. The copolymer multi-stage latex particle of claim 7, wherein the Tgc of the first stage ranges from about 35° C. to about 60° C.

9. The copolymer multi-stage latex particle of claim 1, wherein the Tgc of the first stage is from about 50° C. to about 80° C. higher than the Tgc of the second stage.

10. The copolymer multi-stage latex particle of claim 9, wherein the Tgc of the first stage is from about 55° C. to about 75° C. higher than the Tgc of the second stage.

11. The copolymer multi-stage latex particle of claim 1, wherein the weight average molecular weight of the second stage ranges from about 10,000 Daltons to about 25,000 Daltons.

12. The copolymer multi-stage latex particle of claim 11, wherein the weight average molecular weight of the second stage ranges from about 10,000 Daltons to about 20,000 Daltons.

13. The copolymer multi-stage latex particle of claim 1, wherein the weight percentage of the first stage ranges from about 20 wt. % to about 55 wt. %.

14. The copolymer multi-stage latex particle of claim 13, wherein the weight percentage of the second stage ranges from about 45 wt. % to about 60 wt. %, and the weight percentage of the first stage ranges from about 25 wt. % to about 50 wt. %.

15. The copolymer multi-stage latex particle of claim 2, wherein the weight percentage of the innermost stage ranges from about 20 wt. % to about 50 wt. %, the weight percentage of the first stage ranges from about 15 wt. % to about 35 wt. % and the weight percentage of the second stage ranges from about 30 wt. % to about 50 wt. %.

16. The copolymer multi-stage latex particle of claim 15, wherein the weight percentage of the innermost stage ranges from about 30 wt. % to about 40 wt. %, the weight percentage of the first stage ranges from about 20 wt. % to about 30 wt. % and the weight percentage of the second stage ranges from about 35 wt. % to about 45 wt. %.

17. An aqueous latex architectural composition comprising the latex particle of claim 1, an optional opacifying pigment and a hydrazine or hydrazone compound to cross-link with the at least one crosslinking monomer.

18. An aqueous latex architectural composition comprising the latex particle of claim 2, an optional opacifying pigment and a hydrazine or hydrazone compound to cross-link with the at least one crosslinking monomer.

* * * * *